US010891201B1

United States Patent
Kozlovsky et al.

(10) Patent No.: US 10,891,201 B1
(45) Date of Patent: Jan. 12, 2021

(54) DYNAMIC RULE BASED MODEL FOR LONG TERM RETENTION

(71) Applicant: EMC IP Holding Company LLC, Hopkinton, MA (US)

(72) Inventors: Vitaly Kozlovsky, St. Petersburg (RU); Alexander Shadrin, St. Petersburg (RU); Denis Serov, Moscow Region (RU); Inga Petryaevskaya, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 649 days.

(21) Appl. No.: 15/498,781

(22) Filed: Apr. 27, 2017

(51) Int. Cl.
  *G06F 16/00* (2019.01)
  *G06F 11/14* (2006.01)
  *G06F 16/185* (2019.01)

(52) U.S. Cl.
  CPC ........ *G06F 11/1469* (2013.01); *G06F 16/185* (2019.01); *G06F 2201/84* (2013.01)

(58) Field of Classification Search
  CPC .......... G06F 16/10; G06F 16/13; G06F 16/18; G06F 16/23; G06F 16/113; G06F 16/122; G06F 16/172; G06F 16/178; G06F 16/182; G06F 16/183; G06F 16/185; G06F 16/188; G06F 16/1752; G06F 16/1774; G06F 16/1847; G06F 16/24561
  See application file for complete search history.

(56) References Cited

U.S. PATENT DOCUMENTS

| | | | | | |
|---|---|---|---|---|---|
| 7,584,341 | B2 * | 9/2009 | Gal-Oz | ................. | G06F 3/0608 711/202 |
| 7,949,637 | B1 * | 5/2011 | Burke | ................... | G06F 3/0649 707/655 |
| 8,452,932 | B2 * | 5/2013 | Pangal | ................ | G06F 11/1456 711/162 |
| 8,566,546 | B1 * | 10/2013 | Marshak | ............. | G06F 11/3409 711/165 |
| 8,706,701 | B1 * | 4/2014 | Stefanov | ............ | G06F 11/1088 707/687 |
| 8,775,368 | B1 * | 7/2014 | Burke | ..................... | G06F 16/13 707/609 |
| 8,868,576 | B1 * | 10/2014 | Faibish | ................ | G06F 16/252 707/755 |

(Continued)

*Primary Examiner* — Ashish Thomas
*Assistant Examiner* — Rezwanul Mahmood
(74) *Attorney, Agent, or Firm* — Staniford Tomita LLP

(57) ABSTRACT

Automated Tiered Storage (ATS) has become widely accepted technique in IT industry. Since IO data has different data densities on storage systems, higher storage capacity and improved performance can be achieved by combining two or more storage device tiers having different performance and cost characteristics. These multiple different storage device tiers can be combined into one automated storage pool, which automatically chooses optimal data placement for achieving both the highest performance and the lowest cost. When the storage device tier information can be stored as metadata for each of the data chunks. When there is a system failure and data needs to recovered, the device tier information metadata can be used to restore data to the predetermined optimum storage device tier of the ATS system which shortens the post-recovery warm-up time.

20 Claims, 6 Drawing Sheets

| 331 | 333 | 335 | 336 | 337 |
|---|---|---|---|---|
| LBA | Chunk | Access Frequency | Policy | Latest ATS Decision |
| LBA 1 | Chunk 1 | F1 | Policy | High |
| LBA 2 | Chunk 1 | F1 | Policy | High |
| LBA 3 | Chunk 2 | F2 | Policy | Med |
| LBA 4 | Chunk 2 | F2 | Policy | Med |
| LBA ... | Chunk ... | F... | Policy | ... |
| LBA m | Chunk n | Fn | Policy | Low |

(56) References Cited

U.S. PATENT DOCUMENTS

| | | | | |
|---|---|---|---|---|
| 8,898,114 B1* | 11/2014 | Feathergill | G06F 16/1752 | 707/648 |
| 8,903,772 B1* | 12/2014 | Hayden | G06F 16/13 | 707/649 |
| 8,935,493 B1* | 1/2015 | Dolan | G06F 3/0649 | 711/161 |
| 8,949,483 B1* | 2/2015 | Martin | G06F 11/261 | 710/16 |
| 8,972,340 B1* | 3/2015 | Haase | G06F 16/113 | 707/609 |
| 8,996,468 B1* | 3/2015 | Mattox | G06F 11/14 | 707/650 |
| 9,098,424 B2* | 8/2015 | Hyde, II | G06F 16/13 | |
| 9,141,633 B1* | 9/2015 | Li | G06F 16/1752 | |
| 9,158,804 B1* | 10/2015 | Rangapuram | G06F 11/1451 | |
| 9,304,914 B1* | 4/2016 | Douglis | G06F 12/0871 | |
| 9,384,206 B1* | 7/2016 | Bono | G06F 3/0683 | |
| 9,459,809 B1* | 10/2016 | Chen | G06F 3/0683 | |
| 9,594,513 B1* | 3/2017 | Delgado | G06F 16/113 | |
| 9,626,116 B1* | 4/2017 | Martin | G06F 11/3034 | |
| 9,690,803 B1* | 6/2017 | Bono | G06F 16/18 | |
| 9,703,664 B1* | 7/2017 | Alshawabkeh | G06F 3/061 | |
| 9,778,946 B2* | 10/2017 | Naik | G06F 16/128 | |
| 9,898,224 B1* | 2/2018 | Marshak | G06F 3/0647 | |
| 9,940,033 B1* | 4/2018 | Alshawabkeh | G06F 11/3485 | |
| 9,965,218 B1* | 5/2018 | Martin | G06F 3/0631 | |
| 10,176,212 B1* | 1/2019 | Prohofsky | G06F 3/0605 | |
| 10,242,011 B1* | 3/2019 | Basov | G06F 16/128 | |
| 10,242,012 B1* | 3/2019 | Basov | G06F 16/18 | |
| 10,254,970 B1* | 4/2019 | Martin | G06F 3/0647 | |
| 10,261,717 B1* | 4/2019 | Martin | G06F 3/0685 | |
| 10,268,526 B1* | 4/2019 | Martin | G06F 9/542 | |
| 10,282,107 B1* | 5/2019 | Martin | G06F 3/0611 | |
| 10,359,968 B1* | 7/2019 | Chen | G06F 3/0665 | |
| 10,409,769 B1* | 9/2019 | Malhotra | G06F 3/067 | |
| 10,496,599 B1* | 12/2019 | Haravu | G06F 11/1464 | |
| 10,585,855 B1* | 3/2020 | Armangau | G06F 16/18 | |
| 10,664,442 B1* | 5/2020 | Liang | G06F 16/14 | |
| 10,769,103 B1* | 9/2020 | Patwardhan | G06F 16/122 | |
| 10,769,146 B1* | 9/2020 | Jian | G06F 16/24524 | |
| 2005/0270856 A1* | 12/2005 | Earhart | G11B 27/329 | 365/189.05 |
| 2007/0208788 A1* | 9/2007 | Chakravarty | G06F 11/1451 | |
| 2008/0301256 A1* | 12/2008 | McWilliams | G06F 12/0806 | 709/214 |
| 2009/0012981 A1* | 1/2009 | Kogoh | G06F 9/4856 | |
| 2009/0119233 A1* | 5/2009 | Dunagan | G06Q 10/04 | 705/412 |
| 2010/0077160 A1* | 3/2010 | Liu | G06F 11/1453 | 711/162 |
| 2010/0332401 A1* | 12/2010 | Prahlad | G06F 3/0649 | 705/80 |
| 2011/0258391 A1* | 10/2011 | Atkisson | G06F 12/0804 | 711/118 |
| 2011/0296133 A1* | 12/2011 | Flynn | G06F 3/0619 | 711/171 |
| 2011/0302582 A1* | 12/2011 | Jacobson | G06F 9/5094 | 718/102 |
| 2012/0011340 A1* | 1/2012 | Flynn | G06F 12/0292 | 711/171 |
| 2012/0166749 A1* | 6/2012 | Eleftheriou | G06F 3/0616 | 711/165 |
| 2012/0198174 A1* | 8/2012 | Nellans | G06F 3/0655 | 711/133 |
| 2013/0054869 A1* | 2/2013 | Tolia | G06F 16/00 | 711/102 |
| 2013/0080732 A1* | 3/2013 | Nellans | G06F 12/0246 | 711/206 |
| 2013/0132690 A1* | 5/2013 | Epstein | G06F 11/1451 | 711/159 |
| 2014/0006465 A1* | 1/2014 | Davis | G06F 16/13 | 707/827 |
| 2014/0025875 A1* | 1/2014 | Wang | G06F 12/0866 | 711/103 |
| 2014/0310247 A1* | 10/2014 | Vijayan | G06F 11/1456 | 707/679 |
| 2014/0310574 A1* | 10/2014 | Yu | G11C 29/72 | 714/773 |
| 2015/0095282 A1* | 4/2015 | Jones | H04L 43/04 | 707/624 |
| 2015/0268880 A1* | 9/2015 | Asayama | G06F 3/068 | 711/114 |
| 2015/0310179 A1* | 10/2015 | Chengat | G06F 19/00 | 705/3 |
| 2016/0026672 A1* | 1/2016 | Zhang | G06F 16/13 | 707/686 |
| 2016/0119349 A1* | 4/2016 | Wang | G06F 21/6218 | 713/168 |
| 2016/0162206 A1* | 6/2016 | Bish | G06F 3/061 | 711/165 |
| 2016/0210064 A1* | 7/2016 | Dornemann | G06F 3/064 | |
| 2016/0210306 A1* | 7/2016 | Kumarasamy | G06F 16/178 | |
| 2016/0266842 A1* | 9/2016 | Drzewiecki | G06F 12/0802 | |
| 2016/0277373 A1* | 9/2016 | Murray | H04L 9/0891 | |
| 2016/0283140 A1* | 9/2016 | Kaushik | G06F 3/0685 | |
| 2017/0024161 A1* | 1/2017 | Katiyar | G06F 3/0689 | |
| 2017/0161286 A1* | 6/2017 | Eda | G06F 3/0685 | |
| 2017/0249080 A1* | 8/2017 | Bonnet | G06F 12/0246 | |
| 2018/0039434 A1* | 2/2018 | Balcha | G06F 3/065 | |
| 2018/0152950 A1* | 5/2018 | Xiong | H04W 74/004 | |
| 2018/0196606 A1* | 7/2018 | Chen | G06F 3/0683 | |
| 2018/0203611 A1* | 7/2018 | Zhou | G06F 3/0685 | |
| 2018/0203865 A1* | 7/2018 | Srinivasan | H04L 9/3247 | |
| 2020/0004582 A1* | 1/2020 | Fornash | H04L 67/1097 | |
| 2020/0036787 A1* | 1/2020 | Gupta | G06F 3/0653 | |

* cited by examiner

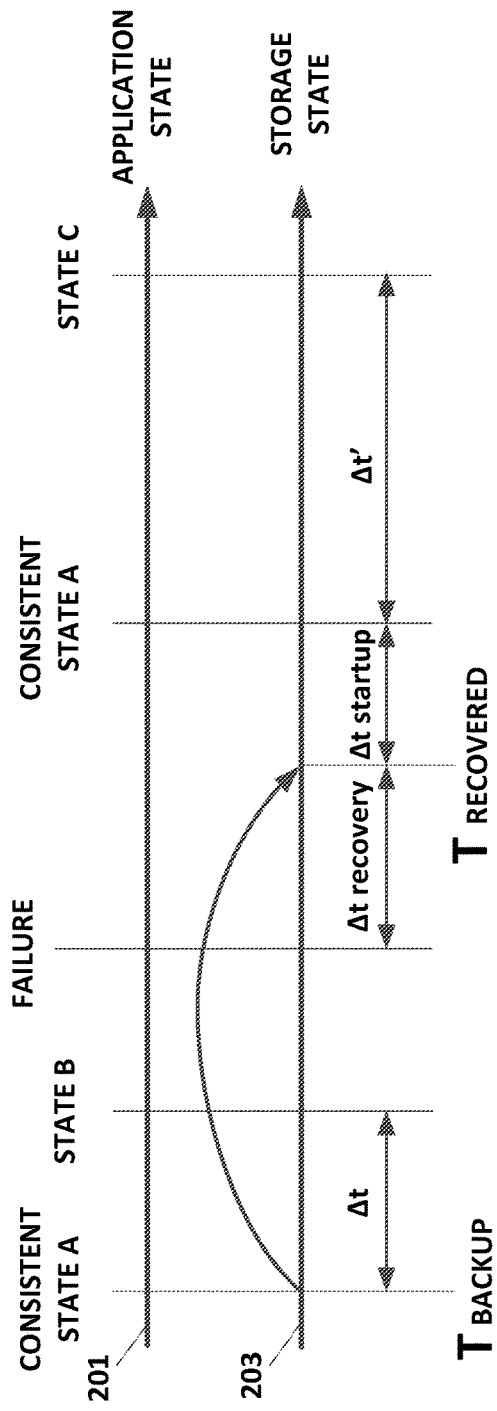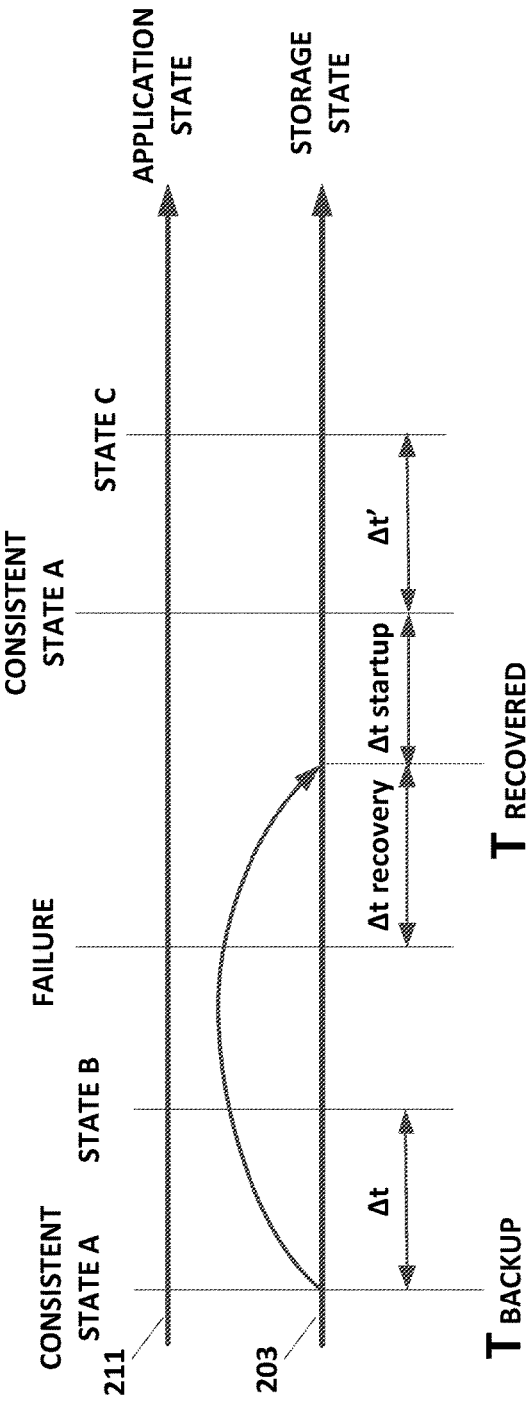

| LBA | Chunk | Access Frequency | Policy | Latest ATS Decision |
|---|---|---|---|---|
| LBA 1 | Chunk 1 | F1 | Policy | High |
| LBA 2 | Chunk 1 | F1 | Policy | High |
| LBA 3 | Chunk 2 | F2 | Policy | Med |
| LBA 4 | Chunk 2 | F2 | Policy | Med |
| LBA ... | Chunk ... | F... | Policy | ... |
| LBA m | Chunk n | Fn | Policy | Low |

FIG. 7

DYNAMIC RULE BASED MODEL FOR LONG TERM RETENTION

TECHNICAL FIELD

Embodiments are generally directed to a method and apparatus for restoring data to tiered storage systems.

COPYRIGHT NOTICE

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Automated Tiered Storage (ATS) has become widely accepted technique in the IT industry. Thanks to different data input/output (IO) densities on storage systems, one can achieve high capacity and performance by combining two or more storage tiers, each having a different storage device. The different tiered storage devices can have various performances and operating costs, which can be combined into one automated storage pool. The ATS can automatically choose an optimal data placement on a specific ATS storage device tier to achieve both the highest performance and the lowest cost. In some embodiments the acquisition costs of ATS systems compared to a traditional storage approaches can be halved and physical footprint reduced 2-3 times, while keeping performance at the same or higher level in typical transactional workload environment by using an ATS system. The purpose of the tiered storage system is to balance the system cost with the performance of each drive type. The higher-performing storage system drives have a much higher cost per GB and provide higher access speeds while lower-performing storage drives have a lower cost per GB but have lower access speeds.

The workload of the ATS is distributed to the different storage devices by algorithms, which leverage the non-random distribution of data access over capacity. The ATS can have a data storage pool containing three different tiers of storage devices. Each tier is made on certain type of disks organized in RAID groups.

In case of a data corruption (caused by some system failure), the data from backup are restored to the ATS storage devices. However, there is a problem with restoring data to the ATS because there is no system for identifying the specific tier storage devices on the ATS that the backup data chunks need to be restored to. The backup data is transferred to the storage devices of the ATS in a sequence determined by backup and restore processes, so the physical placement of the restored data significantly differs from their placement at a moment, when the backup was taken. Some of the "hot" data that is frequently accessed will be stored on the low performance storage devices. The low performance storage device cannot provide the data to the clients at the required speed, which in turn disrupts client service. Some of the "cold" data that is infrequently accessed will be stored on the high performance storage device. The higher cost of these high performance storage devices are wasted storing infrequently accessed data. Thus, the randomly restored data results in slow performance and highly inefficient operation of the ATS after a backup data restoration. The data will be eventually moved to the proper storage devices on the ATS by the storage system algorithms as access frequency is detected after backup restoration during a warm up period. However, this ATS storage correction can take a substantial amount of time during which the ATS will operate slowly and inefficiently. What is needed is an improved system, which restores backup data to the proper ATS storage device.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Replicator, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 3 illustrates a time line for data recovery without ATS device information.

FIG. 4 illustrates a time line for data recovery using ATS device information.

FIG. 7 illustrates an embodiment of block map for an ATS system.

DETAILED DESCRIPTION

Figure 1:
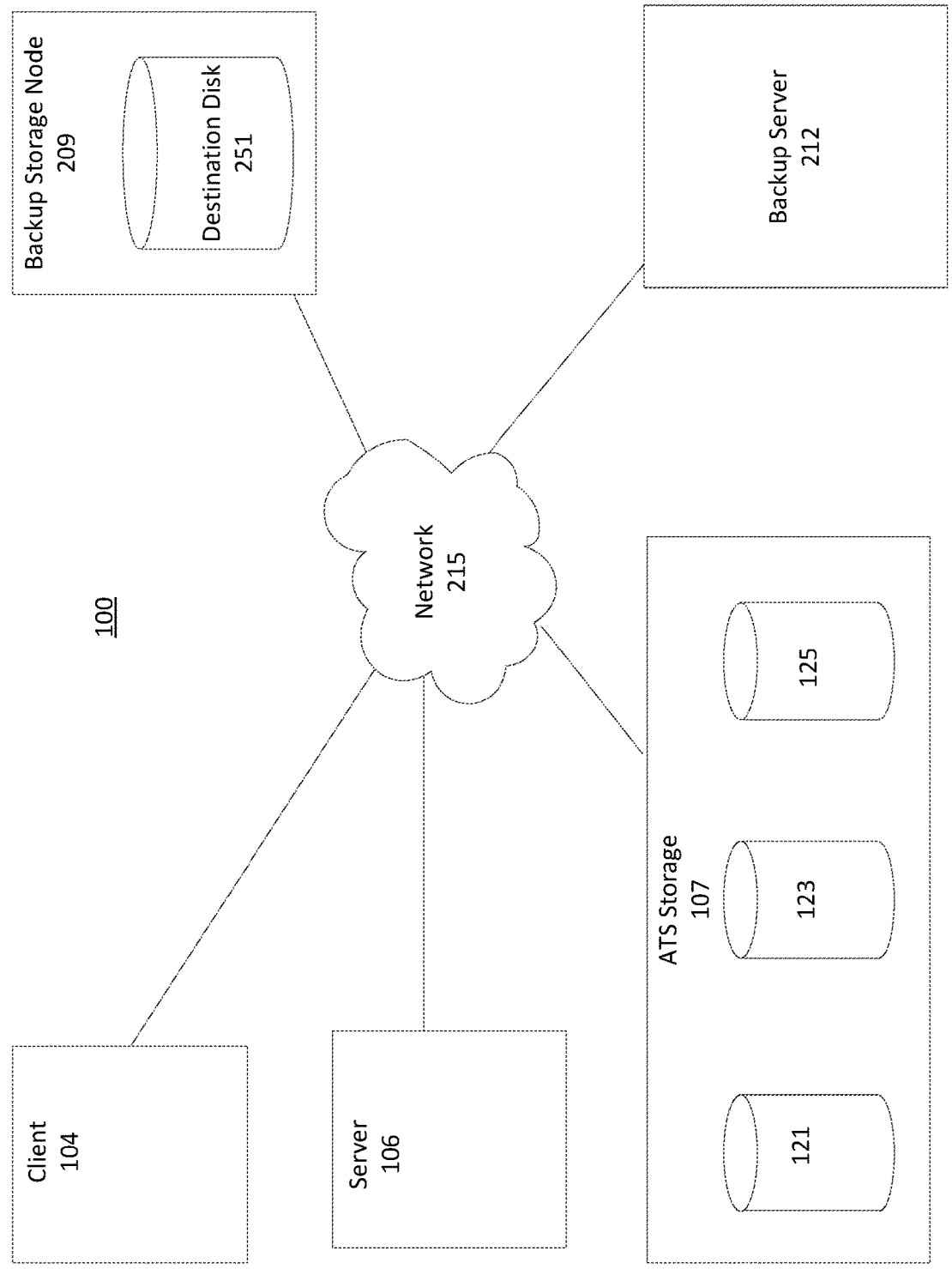
FIG. 1 is a diagram of a large-scale network implementing a ATS backup model, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or a computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for restoring data to an ATS storage system. The data restoration can be used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Automated Tiered Storage (ATS) has become a widely accepted data storage technique. Thanks to different data input/output (IO) densities on storage systems, an ATS can achieve high capacity and performance by combining two or more storage tiers of various performance and lower cost into one automated storage pool. During normal operation, the ATS can automatically choose an optimal data placement on different storage device tiers to achieve both the highest performance and the lowest cost. In an embodiment, there is an effective solution for multi-tier approach management named Fully Automated Storage Tiering (FAST). The FAST algorithm assures the automated transition of the blocks between tiers and manages statistics, which controls what chunk should be moved to faster tier storage device and what chunk should be moved to a slower tier storage device. Data chunks or blocks that require faster tier storage are considered to be "hot" while unpopular data can be considered "cold" chunks or blocks that are moved to the slow tier data storage.

Practical observations of ATS systems have shown that the most IO requests are being sent to a relatively small portion of data. For example, it is very common for most data to follow the Rule of Paretto, in which less than 20% of data stored on the ATS system will receive more than 80% of the IO requests. Because this data is much more active, it can be stored in the top tier data storage device, while the majority (80%) of the data can be stored in the lower tier storage devices. In real world implementations, the critical process for achieving the best response time is the identification of what data should reside on what tier. The process can consist of the following steps: 1) data access monitoring to identify the most frequently accessed blocks, 2) creation of data movement plan and 3) following the plan of execution by moving the data to the proper storage device tier based upon the data movement plan. These three steps can be performed in sequential circular manner, one after another. This process can also be known as a "warming-up" process for data storage, the ATS system can tune itself for the most efficient and cost effective execution of workload profile. The ATS system can have significant benefits over traditional storage systems. The acquisition costs of an ATS system can be approximately half the cost of a traditional storage system and the physical footprint can be reduced 2-3 times, while keeping performance at the same or higher level in typical transactional workload environment.

The process of backing up, refers to the copying and archiving of computer data so it may be used to restore the original after a data loss event. The primary purpose of the backup is to recover data after it is lost by data deletion, data corruption, or system failure. The secondary purpose of backups is to recover data from an earlier time, according to a user-defined data retention policy. Though backups represent a simple form of disaster recovery, backups by themselves should not be considered a complete disaster recovery plan. One reason for this is that existing backup systems are unable to reconstitute the data to the different storage device tiers of the ATS storage system by simply restoring data from a backup.

FIG. 1 illustrates a computer network system 100 that implements one or more embodiments of a system that uses ATS system storage 107 and can restore data to an ATS storage system 107 more efficiently. In system 100, a number of clients 104 are coupled directly or indirectly to an application server 106, an ATS storage system 107, a backup server 212 and a backup storage node 209 through the network 215. The network 215 may be a cloud network, LAN, WAN or other appropriate network provided to serve as backup clients or nodes. The network 215 provides connectivity to the various systems, components, and resources of system 100, and may be implemented using protocols such as Transmission Control Protocol (TCP) and/or Internet Protocol (IP), well known in the relevant arts. In a distributed network environment, the network 215 may represent a cloud-based network environment in which applications, servers and data are maintained and provided through a centralized cloud computing platform. In an embodiment, the system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The ATS system 107 in the illustrated embodiment has three different types of storage devices: Flash 121, SAS 123, and NL-SAS 125. However, in other embodiments, there can be any number of storage device tiers, for example the ATS system 107 can include two or more different storage device tiers. The different storage device tiers differ in performance characteristics such as: capacity, access speed and cost. A first high performance storage tier can be flash drive storage devices, a second middle performance tier can be Serial Attached SCSI (SAS) drives and a third capacity tier can be Near-Line SAS (NL-SAS) drives. The first high performance tier can be flash drives that are built on solid-state drive technology and have no moving parts. Flash drives can deliver substantially better performance than traditional spinning disks for many IO workloads with multi-access response times less than 10 ms. However, flash drives have a higher per gigabyte cost than have traditional spinning drives. The second performance tier can be SAS drives which can be traditional spinning disk drives, which can offer high levels of performance with multi-access response times less than 10-50 ms. The second performance tier storage can have a high efficiency and a lower cost than flash storage devices. The third capacity tier can be NL-SAS drives which are designed for maximum capacity at a modest performance level. The NL-SAS drives can also be rotating disk drives that rotate at a slower rotational speed than the SAS drives. The third tier NL-SAS drives can significantly reduce the energy use but may only have substantially lower performance compared to flash drive storage with multi-access response times up to 100 ms.

Figure 2:
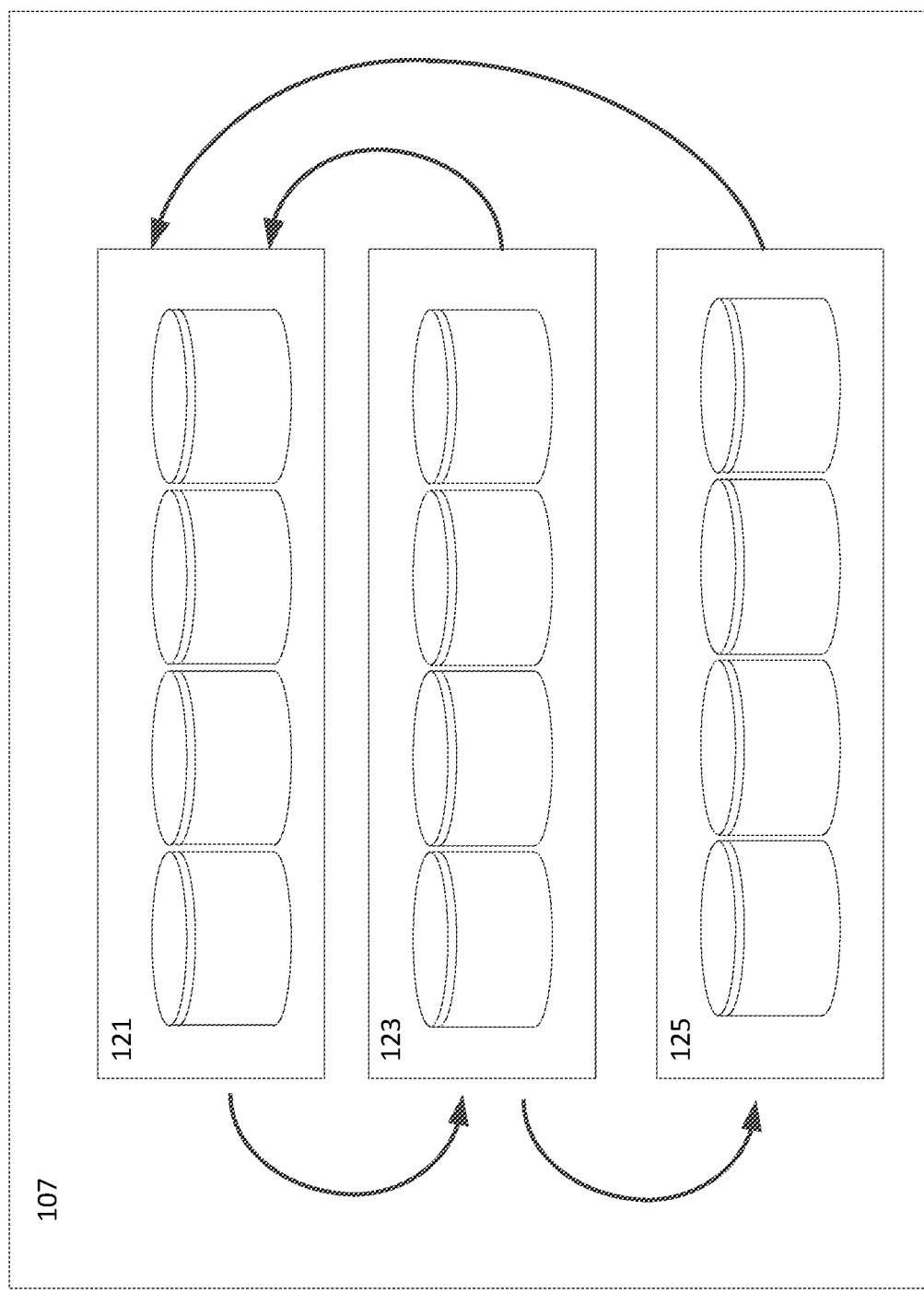
FIG. 2 shows an embodiment of a ATS system.

The ATS system 107 allows the storage device design to provide optimal tiered pool, in which more frequently accessed data is stored on a high performance storage device such as flash 121 while less frequently accessed data is stored on lower performance storage devices such as NL-SAS 125. With reference to FIG. 2, the ATS system 107 can intelligently manage the placement of data on the different tiers (flash 121, SAS 123, and NL-SAS 125) of the storage system according to various data metrics including statistics and activity level of the data in accordance with a dynamic storage tiering policy. The activity level can be determined by the number of IOs, which are reads and writes for each chunk of data. As a result, the most accessed data are moved "up" on the fastest storage tier, and the least frequently accessed data are moved "down" to the most economical high-capacity tier.

The ATS system 107 can quickly relocate the most active data to the highest available tier storage device flash 121 directly from the middle tier storage devices, SAS 123 and the lower tier storage NL-SAS 125 based upon detected data activity. The ATS system 107 can also relocate less active data to lower tier storage devices from the highest available tier storage device 121 to the middle tier SAS 123 and from the middle tier SAS 123 to the lower tier NL-SAS 125. The ATS system 107 can normally leave some extra storage capacity on the highest tier storage device 121 so that hot data that is being accessed more frequently can be quickly moved to the highest available tier storage device flash 121. In contrast, the data that is moved from the highest tier storage device 121 to the medium performance SAS 123 and the slower lower performance storage NL-SAS 125 can occur more slowly because the detection of data inactivity takes more time to determine. This process of analyzing the stored data in the ATS and relocating the stored data to the optimum tier storage devices can take a substantial amount of time. When the data is properly stored on the high tier 121, medium tier 123 and lowest tier 125 storage devices, the ATS system 107 can provide optimized performance. While the movement of data is ongoing, the changes in tiered storages are likely to be minimal after an initial warm up phase.

When data is stored in the ATS system 107, the tier storage device information can be stored as metadata for each piece of data stored in the ATS system 107. When data is moved to a different data storage device tier, the metadata information can be revised to reflect the most current storage level tier. The storage level information for each piece of data can be stored in random access memory (RAM) on the backup server 212 and/or the ATS system 107. The storage level information for each piece of data can also be stored with the backup data. When there is an ATS system 107 failure, the storage level information from the metadata can be used to move the data to the proper storage tier level during a data restoration process.

With reference to FIG. 1, the data stored on all of the memory devices 121, 123, 125 in the ATS system 107 can be backed up on a backup media 251 on the backup storage node 209. The backup media 251 may be located at any number of persistent storage locations and devices, such as local client storage, server storage, or network storage, which may at least be partially implemented through storage device arrays, such as RAID components. An embodiment of the system 100 may be implemented to provide support for various storage architectures such as storage area network (SAN), Network-Attached Storage (NAS), or Direct-Attached Storage (DAS) that make use of large-scale network accessible storage devices such as a large capacity tape or drive (optical or magnetic) arrays. In an embodiment, the target storage devices, such as a tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology. Information stored on the ATS system 107 can be backed up on the backup storage node 109. As discussed, the backup data with metadata indicating the storage level tier for the data can be stored on the backup node 209. When there is a system failure, the backup server 212 executes processes for restoring the backed up data to the ATS system 107 from the backup storage node 209 through the network 215.

When there is a system failure, the data on the ATS storage devices 121, 123, 125 is erased and the backup data on the backup storage node 209 is transferred to the ATS system's tiered storage devices. With prior ATS systems, the data restoration process included the random distribution of data chunks amongst the ATS storage devices. The ATS system then has to repeat the warm-up process to redistribute the data amongst the different tiers of the storage devices to optimize the system performance. During the warm-up process, the ATS system's performance is poor and inefficient.

In contrast, the inventive ATS system uses storage device information for each chunk of information that is stored as backup data so that during data recovery the data chunks can be returned to the proper ATS storage devices. The tiered storage device information for the data chunks is stored as metadata on random access memory and/or metadata that is stored with the backup data chunks stored on a backup storage node. The ATS system uses the storage device information metadata to direct each chunk of data to the proper tier storage device of the ATS. The system can then perform a warm up process to optimize the locations of the data chunks in the ATS. Because the data is restored to the correct ATS storage devices from a prior backup time, the ATS system will quickly return to optimal performance and efficiency. This shift in storage industry has created a need for a different approach to both backup and recovery of data from ATS systems. This invention improves the ATS recovery process by shortening its post-recovery warm-up time FIG. 3 illustrates a timeline for backup and recovery processes for an ATS system that does not utilize tier storage information metadata. The upper horizontal timeline 201 can represent the application state and the lower horizontal timeline 203 can represent the storage state. Examples of the application states include: startup, application consistent state and application intermediate state. The application startup states can include OS startups such as Windows boot and Application startups. Application consistent state can occur when all queries are committed and cache is flushed. The timeline 201 can start with a "Consistent State A" application state and the timeline 203 can start with a "T backup" storage state. At each consistent state, all queries can be committed and the cache can be cleared. Application state can also have intermediate states between the consistent states when the application can perform calculations and data processing during transition times between stable states and continuous processing The ATS data from consistent state A is stored in the backup storage device so "T backup" is the moment when the backup of the data lying on ATS system occurs. After the backup is performed and after a Δt period of time, the application reaches "State B." As the ATS system is used, data is relocated within the different tier levels (for example, high, medium and low) in the ATS system between "consistent state A" and "state B" during a Δt time period. The ATS system then suffers an Application failure. A data recovery from the backup has been triggered and when backup data is transferred to the ATS storage devices. The backup data from the backup storage node is transferred to the ATS system during a "Δt recovery" time period. When the backup data has been loaded into the ATS system, the data storage state is "T recovered."

After the "Δt recovery" time period, the data is restored to the ATS storage devices and the application can run during the "Δt startup" time period. For example, the application operation could be OS or application load/startup. The application recognizes that the data has just been restored on the storage devices of the ATS system. The application can bring all internal memory content to the state when it can start processing data. For example, Δt startup" time period can occur after the user pressed the launch icon on the desktop, or some software service application, which starts automatically after the backup data restore was triggered. During the Δt' time period, the ATS system can move data to the proper tier storage devices as determined by the tiering policy algorithms while the application runs.

The tiering policy algorithms can be based upon various metrics, including the detected access frequency of the data after backup restoration. Since the storage device information is not known, the backup data is transferred randomly to the different tiers of the ATS system. Some of the frequently accessed "hot" data will be stored on the low performance storage devices that cannot provide the data to the clients at the required speed, which can disrupt client service. Some of the "cold" data that is infrequently accessed will be stored on the high performance storage device. However, the higher cost high performance storage devices are wasted storing this cold infrequently accessed data. The relocation of the data to the proper tiered storage device during the Δt' time period can be time consuming by further delaying the ATS system reaching a consistent state A again as it can take hours or even days. However, eventually the application state will return to consistent state A.

FIG. 4 illustrates an embodiment of a timeline for backup and recovery processes for an ATS system that does utilize tier storage information metadata to place the recovered data to the tiered storage devices. The upper horizontal timeline 211 can represent the application state and the lower horizontal timeline 213 can represent the storage state. The time lines illustrated in FIGS. 3 and 4 are the same from T backup to the application failure. At this point with reference to FIG. 1, the backup server 212 processes include processes to store the tiered storage device information for each block of backup data as metadata, which can be stored in RAM on the backup client 104 and/or as metadata stored with the backup data on the backup media 251 of the backup storage node 209. The backup storage node executes the backup data recovery processes for writing the backup data to the ATS storage 107 using the metadata indicating the tiered storage device information to the backup devices or volumes and reading the data and the metadata from the backup storage devices or volumes at the request of the client during a recovery. While the "Δt recovery" and "Δt startup" time periods in FIGS. 3 and 4 can be approximately the same, the subsequent Δt' time can be substantially shorter because the storage device information stored in metadata is used to place the recovered data in the storage tiers of the ATS system as recorded from the storage state "T backup" at the application state "constant state A."

Figure 5:
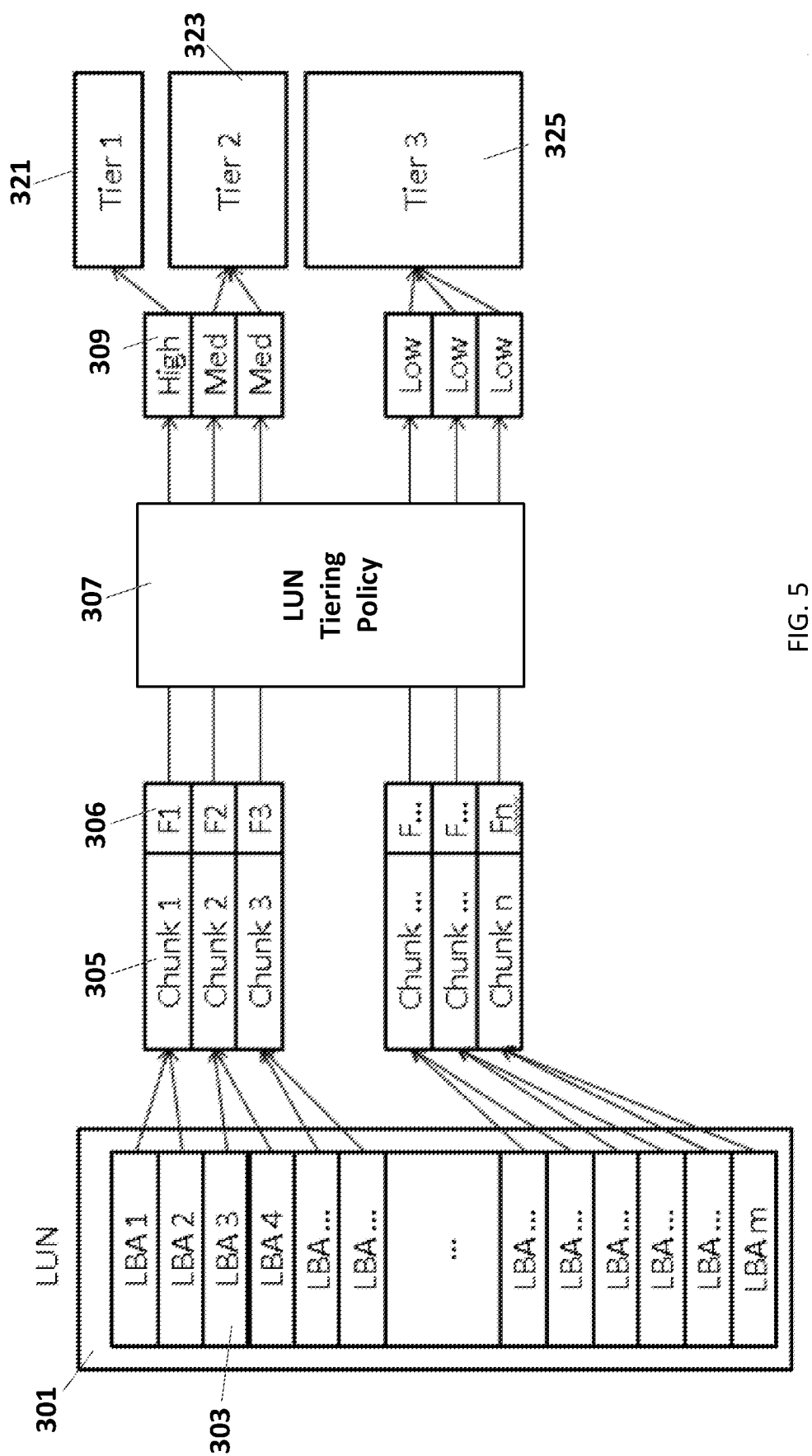
FIG. 5 illustrates an embodiment of an ATS system when the tier category information for the data is lost.

With reference to FIG. 5, a block diagram illustrates the sorting of data by the ATS system during a warmed-up state. Data can have logical unit numbers (LUNs) 301, which can be used to identify the logical units. The chunks 305 of data can be the minimal ATS monitored object and the chunks can include one or more logical block addressing (LBA) 303. Each chunk 305 of data can have an IO frequency of access 306, which can be represented in this example by F1, F2, . . . Fn with a higher frequency representing more IO activity. The LUN Tiering policy can be a set of ATS rules, which are used for the storage of the different chunks on different tiers of the ATS storage. In this example, the measured frequencies of access 306 can be categorized into high medium or low. The data chunks 305 can be stored on any ATS system storage device. The tiering policy 307 can process the IO frequency information and convert the IO frequency 306 into a tier category 309 that represents the different tiers of the ATS storage device. In this example, the tiering policy 307 can direct data chunks with a high measured frequency of access to the Tier 1 storage device 321, chunks with medium frequency of access to the Tier 2 storage device 323, and data chunks with low frequency of access to the Tier 3 storage device 325. In the illustrated example, the chunk 1 305 having an IO frequency F1 306 has been categorized by the LUN tiering policy 307 as being a high tier category 309 for storage in the Tier 1 storage device 321. Chunk 2 305 with an IO frequency of F2 and chunk 3 305 with an IO frequency of F3 are categorized by the LUN tiering policy 307 as being a medium tier category 309 for storage in the Tier 2 storage device 323. The remaining chunks 306 are categorized by the LUN tiering policy 307 as being low tier category 309 for storage in the Tier 3 storage device 325.

An effective data layout of the LUN tiering policy 307 and the tiered storage devices 321, 323, 325 can be the key for good application performance and positive customer experience for an ATS system. The optimum data arrangement on the tiered storage devices 321, 323, 325 can be very dynamic and achieved as a result of continuous iterations. The described ATS system discloses systems and methods for preserving the achieved iterated efficiency in ATS systems, by backing up the tiered storage data in such way that would allow not only protected data to be simply be restored to the ATS system but effectively place the data chunks in their optimum tiered storage devices 321, 323, 325, as well.

Although the storage layout of the data chunks in the ATS system is continuously changing and is dynamic in nature by design, the most critical period is the initial period, when all data chunks are considered as "equal" before the IO frequencies of the data chunks are known. Most of the data chunk movement between the tiered storage devices 321, 323, 325 happens during the execution of initial movement plans by the LUN tiering policy 307. During this initial period application performance may experience serious degradation, because ATS storage layouts are mostly sized for a generic data "warmed up" state. In situations with incoming workload pressure, the degraded period of "warming up" may last from many hours to several days as discussed above with reference to FIG. 3.

When ATS system has passed the initial "warm up" period, much less data movements between the tiered storage devices 321, 323, 325 have to be performed by the LUN Policy 307, because most workloads tend to stay within their average profile with very gradual change of data access frequencies. As long as ATS system is warmed up and data storage changes between the tiered storage devices 321, 323, 325 are gradual, the system performance and the user experience will be good.

When there is a system failure that requires the restoration of data to the ATS system, the LUN restored data 301 can be obtained from the backup media. The ATS system can use the recovered tier category information metadata from RAM or from the backup media. The ATS system can use the tier category information metadata to properly direct each data chunk 305 to the previously determined optimal tiered storage devices 321, 323, 325. Because the tier category information is known as the "warm up" period after the data restoration is minimized and the application can be restored to a high performance state quickly. This shortened "warm up" period is illustrated as "Δt'" in FIG. 4.

Figure 6:
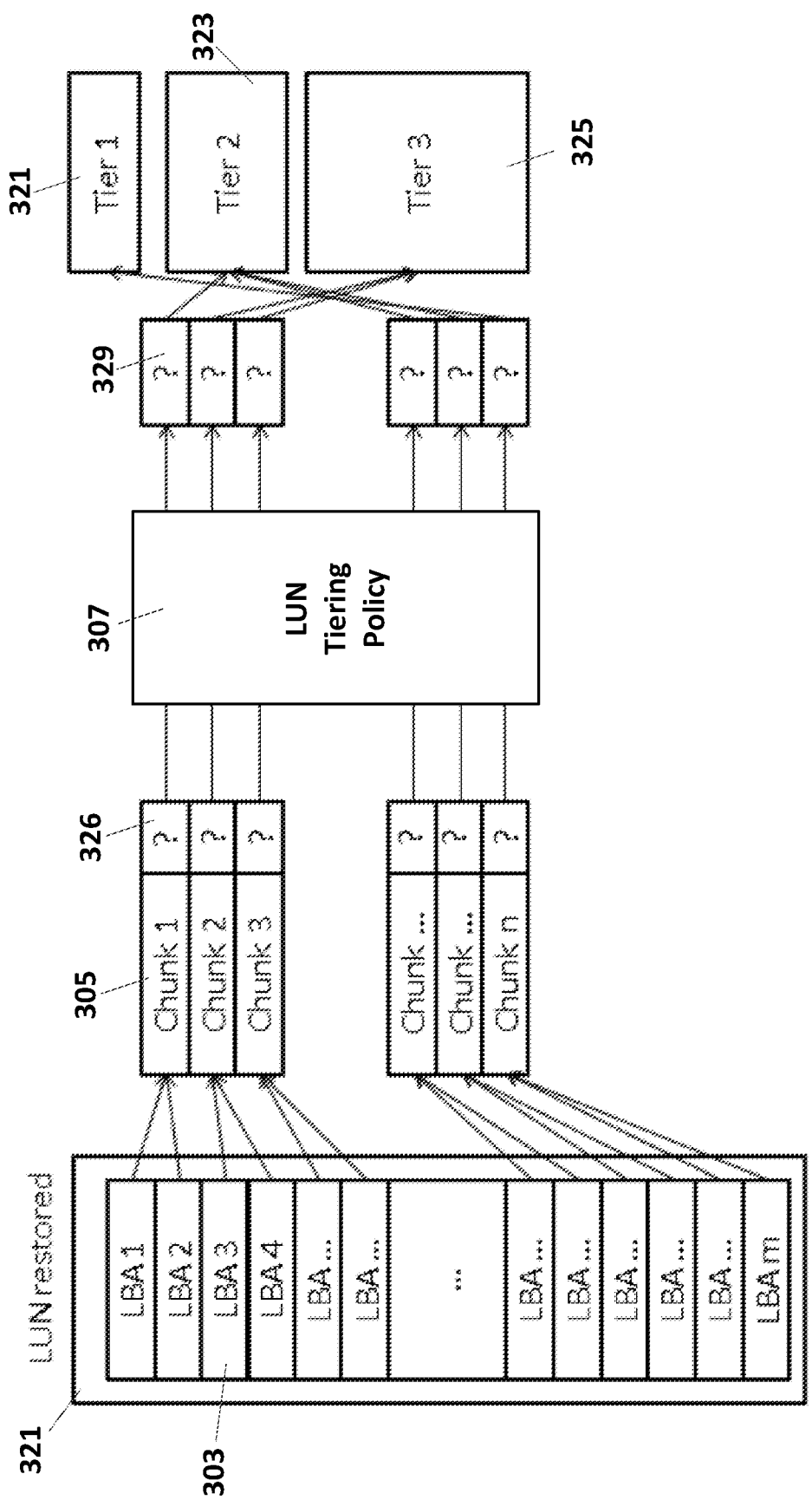
FIG. 6 illustrates an embodiment of an ATS system when the tier category information for the data is used to properly sort the data.

With reference to FIG. 6, an embodiment of an ATS system is illustrated when the tier category information for the data chunks is lost. The high performance operating state can be lost when existing application data is fully restored from backup after major hardware failure, which requires recreating the tiered storage pool. The LUN restored 321, which includes the LBA 303 of the data chunks 305. However, the IO frequency information 326 for each data chunk 305 is lost. Since all data chunks 305 are equal without the IO frequency information 326, the LUN tiering policy 307 cannot know the tier categories 329 for the data chunks 305 and the data chunks are randomly distributed to the tiered storage devices 321, 323, 325 as indicated by the crossed arrows from the tier categories 329. When there is no storage device information such as the tier categories 329 for the data chunks, the ATS system must re-warm itself as if it was being initially used with unknown equal data chunks 305 in a beginning storage process. This results in very slow ATS system performance and a bad customer experience, which can take a very long time to restore from backup and increases effective application recovery time objective (RTO). This extended "warm up" period is illustrated as "Δt'" in FIG. 3.

In embodiments of the present invention that utilize the FAST system or other systems of ATS system management, for example NetApp or Hitachi products, the dynamic data structure is used to keep track of the blocks on the different storage tiers. This block map with storage device information as metadata can be kept in RAM (as it is currently implemented in EMC FAST) and it can be continuously updated according to the workload (applications) activity. In essence, the map contains the link to the block, reference counter (how many times the block was requested by application), flag of the level of the tier and some meta-information like hashes and checksums.

With reference to FIG. 7, an embodiment of a possible data block map is illustrated. The map can include the LBA 331 for the data, the chunk 333 identification, the access frequency 335, the policy 336 being used for the storage tier categorization and the last ATS categorization decision 337. In the illustrated example, the first two rows identify data that has an access frequency F1 and based upon the "policy" the latest ATS decision is the high tier data storage device. The third and fourth rows identify data that has an access frequency F2 and the latest tier categorization is the medium tier data storage device. The bottom row identifies data that has an access frequency Fn, which has the latest tier categorization of a low tier data storage device. This metadata for the data can also be stored with on a backup data storage system. This data block map is then used in the event of a data restoration procedure for the ATS system.

With reference to FIG. 4, in an embodiment, at backup time $T_{backup}$, the ATS system can save the tier map along with the backup. In response to an application failure, at the time of restoration, the data blocks are allocated by the tier management system according to the loaded tier map. For example, in an EMC ATS system, the FAST can use the loaded tier map to allocate each of the data blocks to the previously determined optimum tiered storage device in the ATS system. The application will recover and perform faster, since there are no delays associated with the blocks transition between tiers because a warm up period is not required. After this backup restoration to the ATS system, the 10 requests are served as quick as if the multi-tiered storage devices on the ATS system were warmed up the tiering policy algorithm based upon normal operation. This allows to minimize the time of getting the application to the State C faster, ideally in this scenario, Δt=Δt' (for case when State B and State C are the same).

Good customer experiences of ATS usage can be achieved by storing a map of the block layout for various storage tiers along with their temperatures (TO statistics) for each user LUN when performing data backup for ATS LUN. As a result, during a full restore of data to an ATS storage device pool, the LUN may be restored along with its most recent data layout on 2 or 3 storage tiers. The ATS system will have a much shorter "warm up" period and as a result, shorter effective RTO. Metadata backup can be performed by exporting ATS LUN metadata from the storage system into a portable format, which could later be backup up with application data and/or kept for later use.

Depending on the implementation, the data block's "temperature" information might not be a discrete value. The popularity of a data block could be indicated by the number of accesses to the block during particular period before the backup. This data block information will allow the system to correctly restore the data on the proper tier storage device of the ATS system even if the data restoration is performed to another system, which might have a different tier configuration that the one the backup was performed from. Using this technique, the most popular blocks will always restored to the faster tier storage device even if the data is migrated to a different ATS system having a different tiered storage device configuration.

The described ATS systems use the storage device information metadata during data restoration to the tiered storage devices. However, in another embodiment, the described storage device information metadata (ATS LUN metadata) can be used for other purposes. For example, in an embodiment, the ATS system can use the ATS LUN metadata in a phase preceding the full restore of a LUN. More specifically, the ATS LUN metadata can be used to re-create a warmed-up state of the LUN, therefore reducing RTO during a subsequent full restore of the LUN.

In another embodiment, the ATS LUN metadata used with a first ATS system can later be used as the information to appropriately configure target second ATS storage system. By migrating the ATS LUN to the second ATS system, the data chunks are transferred to the optimum storage device tiers of the second ATS system. The use of the ATS LUN metadata during tech-refresh will allow the data chunks to be transferred to the proper storage device tiers of the second ATS system and will prevent the second ATS system from having to perform the warm up process with all data being initially viewed as equal. Thus, the ATS LUN metadata will make the migration of data from the first ATS system to the second ATS system smooth and comfortable.

The described systems and processes can be used to improve the efficiency of FAST ATS management systems. In different embodiments, the FAST ATS management systems can require a functionality implementation, which allows saving the RAM handed map table of descriptors on a storage media such as a disk media when a backup process is triggered. The FAST system can be notified when the restore process is triggered and the pointer to the descriptors map should be handed to the FAST to start recovery to properly route the data chunks to the optimally designated storage device tier of the ATS system.

As is common with systems using large pools of drives in an ATS system, there will be multiple workloads applied to each storage device tier. In an embodiment, the multiple workloads might be produced by different physical hosts that share the pool of storage devices. The described systems and methods can allow the ATS system to quicken the restore process after a failure for multiple applications to minimize application downtimes after a system failure. The modern multi-tiered storage will be automatically set for optimal efficiency right after the data is restored from backup according to the application's needs. This approach expedites the RTO, performing less write cycles on the storage media, significantly saving the system resources and extending the storage media life time.

The proposed approach may also be used as an optional feature to existing algorithms. The proposed approach is based on existing internal data structures used in multi-tiered storage management subsystems. The new approach also adds new improvements to systems like EMC FAST. The proposed approach improves known backup and restore techniques shortening the time required for the system and application to return to normal functioning after the data is restored from the backup. In critical cases, the inventive systems and methods may significantly improve performance by improving the recovery time of the ATS system, when fast real-time service application recovery is needed.

The proposed approach might be considered as an industry standard.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for restoring data on a multi-tiered storage system comprising:
   providing a server, which uses the data, coupled to a backup storage device and the multi-tiered storage system having a first storage device and a second storage device, wherein the first storage device has a higher performance than the second storage device;
   storing a first group of the data on the first storage device and a second group of the data on the second storage device, wherein the first group of the data is accessed by the server more frequently than the second group of data;
   writing by the multi-tiered storage system, storage device information as metadata for each of the first group of the data and the second group of the data;
   backing up the first group of the data and the second group of the data on the backup storage device;
   creating a data block map which includes a storage tier categorization that is based upon an access frequency for each of the first group of data and the second group of data, wherein the data block map comprises an identifier, an access frequency, a tiering policy, and a last categorization for each data chunk for each of the first group of data and the second group of data, wherein the last categorization is used to optimize migration of the data in case of loss of present categorization information for each data chunk;
   recovering the first group of the data and the second group of the data on the backup storage device when a data restore is required;
   identifying physical locations of the data, corresponding to a backup time, for each of the first group of the data and the second group of the data based upon the storage tier categorization for each of the first group of data and the second group of data recorded on the data block map; and
   restoring a first group of the data on the first storage device and a second group of the data on the second storage device.

2. The method of claim 1 further comprising:
   moving a first portion of the first group of the data on the first storage device to the second group of the data on the second storage device, wherein the server reduces the access frequency of the first portion of the first group of the data; and updating by the storage system, the storage tier categorization on the data block map for the first portion of the first group of data.

3. The method of claim 2 further comprising:
moving a second portion of the second group of the data on the second storage device to the first group of the data on the first storage device, wherein the server increases the access frequency of the first portion of the first group of the data; and
updating by the storage system, the storage tier categorization on the data block map for the second portion of the second group of data.

4. The method of claim 1 further comprising:
providing a third storage device on the multi-tiered storage system, wherein the second storage device has a higher performance than the third storage device;
storing a third group of the data on the third storage device wherein the second group of the data is accessed by the server more frequently than the third group of data;
writing by the storage system, storage tier categorization for each of the third group of the data on the data block map;
backing up the third group of the data on the backup storage device;
recovering the third group of the data on the storage device when the data restore is required;
identifying previous storage locations for each of the third group of the data based upon the data block map; and
restoring a third group of the data on the third storage device.

5. The method of claim 4 further comprising:
moving a first portion of the second group of the data on the second storage device to the third group of the data on the third storage device, wherein the server reduces the access frequency of the first portion of the second group of the data; and
updating by the storage system, the storage tier categorization on the data block map for the first portion of the second group of data.

6. The method of claim 5 further comprising:
moving a second portion of the third group of the data on the third storage device to the first group of the data on the first storage device, wherein the server increases the access frequency of the second portion of the third group of the data; and
updating by the storage system, the storage tier categorization on the block map for the second portion of the third group of data.

7. The method of claim 1 wherein the first storage device has higher performance characteristics as IO speed, than the second storage device.

8. A system for storing data on a long term retention storage, the system comprising:
a processor-based system executed on a computer system and configured to:
provide a server coupled to a backup storage device and the multi-tiered storage system having a first storage device and a second storage device, wherein the first storage device has a higher performance than the second storage device;
store a first group of the data on the first storage device and a second group of the data on the second storage device, wherein the first group of the data is accessed by the server more frequently than the second group of data;
write by the multi-tiered storage system, storage device information as metadata for each of the first group of the data and the second group of the data;
back up the first group of the data and the second group of the data on the backup storage device;
creating a data block map which includes a storage tier categorization that is based upon an access frequency for each of the first group of data and the second group of data, wherein the data block map comprises an identifier, an access frequency, a tiering policy, and a last categorization for each data chunk for each of the first group of data and the second group of data, wherein the last categorization is used to optimize migration of the data in case of loss of present categorization information for each data chunk;
recover the first group of the data and the second group of the data on the backup storage device when a data restore is required;
identifying physical locations of the data, corresponding to a backup time, for each of the first group of the data and the second group of the data based upon the storage tier categorization for each of the first group of data and the second group of data recorded on the data block map; and
restore a first group of the data on the first storage device and a second group of the data on the second storage device.

9. The system of claim 8 wherein the processor-based system is further configured to:
move a first portion of the first group of the data on the first storage device to the second group of the data on the second storage device, wherein the server reduces the access frequency of the first portion of the first group of the data; and
update by the storage system, the storage tier categorization on the data block map for the first portion of the first group of data.

10. The system of claim 8 wherein the processor-based system is further configured to:
move a second portion of the second group of the data on the second storage device to the first group of the data on the first storage device, wherein the server increases the access frequency of the first portion of the first group of the data; and
update by the storage system, the storage tier categorization on the data block map for the second portion of the second group of data.

11. The system of claim 8 wherein the processor-based system is further configured to:
provide a third storage device on the multi-tiered storage system, wherein the second storage device has a higher performance than the third storage device;
store a third group of the data on the third storage device wherein the second group of the data is accessed by the server more than the third group of data;
write by the storage system, storage tier categorization for each of the third group of the data on the data block map;
back up the third group of the data on the backup storage device;
recover the third group of the data on the backup storage device when the data restore is required;
identify previous storage locations for each of the third group of the data based upon the data block map; and
restore a third group of the data on the third storage device.

12. The system of claim 11 wherein the processor-based system is further configured to:
move a first portion of the second group of the data on the second storage device to the third group of the data on the third storage device, wherein the server reduces the access frequency of the first portion of the second group of the data; and
update by the storage system, the storage tier categorization on the data block map for the first portion of the second group of data.

13. The system of claim 12 wherein the processor-based system is further configured to:
move a second portion of the third group of the data on the third storage device to the first group of the data on the first storage device, wherein the server increases the access frequency of the second portion of the third group of the data; and
update by the storage system, the storage tier categorization on the block map for the second portion of the third group of data.

14. The system of claim 8 wherein the first storage device has higher performance characteristics as IO speed, than the second storage device.

15. A computer program product, comprising a non-transitory computer-readable medium having a computer-readable program code embodied therein, the computer-readable program code adapted to be executed by one or more processors to implement a method comprising:
providing a server, which uses the data, coupled to a backup storage device and the multi-tiered storage system having a first storage device and a second storage device, wherein the first storage device has a higher performance than the second storage device;
storing a first group of the data on the first storage device and a second group of the data on the second storage device, wherein the first group of the data is accessed by the server more frequently than the second group of data;
writing by the multi-tiered storage system, storage device information as metadata for each of the first group of the data and the second group of the data;
backing up the first group of the data and the second group of the data on the backup storage device;
creating a data block map which includes a storage tier categorization that is based upon an access frequency for each of the first group of data and the second group of data, wherein the data block map comprises an identifier, an access frequency, a tiering policy, and a last categorization for each data chunk for each of the first group of data and the second group of data, wherein the last categorization is used to optimize migration of the data in case of loss of present categorization information for each data chunk;
recovering the first group of the data and the second group of the data on the backup storage device when a data recovery is required;
identifying physical locations of the data, corresponding to a backup time, for each of the first group of the data and the second group of the data based upon the storage tier categorization for each of the first group of data and the second group of data recorded on the data block map; and
restoring a first group of the data on the first storage device and a second group of the data on the second storage device.

16. The computer program product of claim 15 wherein the computer-readable program code is adapted to be executed by one or more processors to implement the method further comprising:
moving a first portion of the first group of the data on the first storage device to the second group of the data on the second storage device, wherein the server reduces the access frequency of the first portion of the first group of the data; and
updating by the storage system, the storage tier categorization on the data block map for the first portion of the first group of data.

17. The computer program product of claim 16 wherein the computer-readable program code is adapted to be executed by one or more processors to implement the method further comprising:
moving a second portion of the second group of the data on the second storage device to the first group of the data on the first storage device, wherein the server increases the access frequency of the first portion of the first group of the data; and
updating by the storage system, the storage tier categorization on the data block map for the first portion of the first group of data.

18. The computer program product of claim 16 wherein the computer-readable program code is adapted to be executed by one or more processors to implement the method further comprising:
providing a third storage device on the multi-tiered storage system, wherein the second storage device has a higher performance than the third storage device;
storing a third group of the data on the third storage device wherein the second group of the data is accessed by the server more than the third group of data;
writing by the storage system, storage tier categorization for each of the third group of the data on the data block map;
backing up the third group of the data on the backup storage device;
recovering the third group of the data on the backup storage device when the data restore is required;
identifying previous storage locations for each of the third group of the data based upon the data block map; and
restoring a third group of the data on the third storage device.

19. The computer program product of claim 18 wherein the computer-readable program code is adapted to be executed by one or more processors to implement the method further comprising:
moving a first portion of the second group of the data on the second storage device to the third group of the data on the third storage device, wherein the server reduces the access frequency of the first portion of the second group of the data; and
updating by the storage system, the storage tier categorization on the data block map for the first portion of the second group of data.

20. The computer program product of claim 19 wherein the computer-readable program code is adapted to be executed by one or more processors to implement the method further comprising:
moving a second portion of the third group of the data on the third storage device to the first group of the data on the first storage device, wherein the server increases the access frequency of the second portion of the third group of the data; and updating by the storage system, the storage tier categorization on the block map for the second portion of the third group of data.

* * * * *